Patented Feb. 19, 1929.

1,702,832

UNITED STATES PATENT OFFICE.

LEOPOLD LASKA AND FRITZ WEBER, OF OFFENBACH-ON-THE-MAIN, GERMANY, ASSIGNORS TO GRASSELLI DYESTUFF CORPORATION, OF NEW YORK, N. Y., A CORPORATION OF DELAWARE.

MONOAZO DYESTUFFS DERIVED FROM NAPHTHYLAMINE CARBOXYLIC ACIDS.

No Drawing. Application filed May 3, 1926, Serial No. 106,547, and in Germany May 8, 1925.

This invention relates to new mono-azo-dyestuffs which contain as one constituent a naphthylamincarboxylic acid and which are suitable for dyeing acetate silk. They may be obtained either by combining a diazotized naphthylamincarboxylic acid with a desired coupling-component or by combining the desired diazocompound with a naphthylamincarboxylic acid.

In the dry state the new dyestuffs are yellow, red, blue to blackish powders which on reduction with stannous chloride yield again the original diazo and coupling components, the latter containing an additional amino group. They dye acetate silk strong yellow, red to blue-violet shades.

All naphthylamincarboxylic acids and their derivatives may be used as the naphthylamincarboxylic acid components. Especially useful are the dyestuffs in which the 2.3-naphthylamincarboxylic acid is used and most prominent are the dyestuffs in which 2.3-naphthylamincarboxylic acid is the coupling component.

*Example I.*—187 parts of 2.3-naphthylamincarboxylic acid are dissolved hot in 285 parts of 20° Bé. hydrochloric acid and 1500 parts of water. This solution is then cooled by the addition of ice and treated with an aqueous solution of 69 parts of sodium nitrite. This ready diazo solution is added to a solution which consists of 110 parts of resorcin, 159 parts of soda and 1000 parts of water. When coupling is complete, the dyestuff having the probable formula:

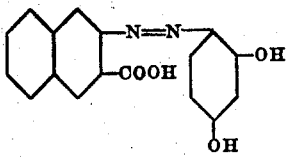

is salted out, pressed and dried. It dyes acetate silk orange colored shades.

*Example II.*—187 parts of 2.6-naphthylamincarboxylic acid are dissolved hot in 1500 parts of water in the presence of 53 parts of soda. The carboxylic acid is again precipitated from this solution with 285 parts of 20° Bé. hydrochloric acid and treated in the cold with an aqueous solution of 69 parts of sodium nitrite. The prepared diazo solution is added to a solution which consists of 144 parts of beta-naphthol, 159 parts of soda, 40 parts of caustic soda and 1000 parts of water. When coupling is complete, the dyestuff having the probable formula:

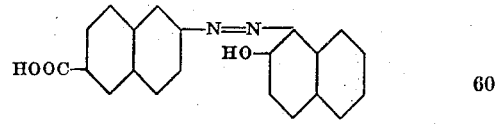

is salted out, pressed and dried. It dyes acetate silk a yellowish rosa.

*Example III.*—168 parts of para-nitro-ortho-anisidin are diazotized in the presence of 285 parts of 20° Bé. hydrochloric acid by treating with an aqueous solution of 69 parts of sodium nitrite. A hydrochloric acid solution of 187 parts of 2.3-aminonaphthoic acid is allowed to run into this diazo solution and the coupling is finished by neutralizing the excess hydrochloric acid with sodium acetate. The dyestuff is then treated with 212 parts of soda and then salted out, pressed and dried. It has the constitution: 4-nitro-6-methoxyphenyl-azo-2-naphthylamin-3-carboxylic acid having the probable formula:

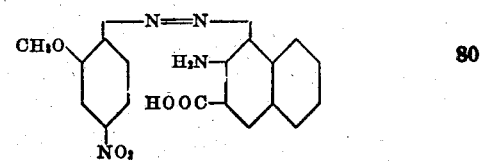

It dyes acetate silk red-violet. Reduction with stannous chloride yields 4-amino-2-anisidin and 1, 2-diamino-naphthalene-3-carboxylic acid.

In the following table several examples of dyestuffs of this invention are given and the color of the dyestuff itself as well as the color of acetate silk dyed therewith. Those dyestuffs which still contain a free amino group may be further diazotized on the fiber and developed with one of the usual components.

| Diazocompound of— | Coupled with— | Color— | |
|---|---|---|---|
| | | of the dyestuff. | of the dyed acetate silk. |
| 2.3-naphthylamin-carboxylic acid | Resorcin | Reddish-brown | Orange. |
| " | 2.3-aminonaphthoic acid | Red | Red. |
| " | β-naphthol | Red | Rosa. |
| " | β-naphthylamine | Red | Brown. |
| " | Ethyl-β-naphthylamine | Red | Red. |
| 1-amino-2-ethoxynaphthalene-6-carboxylic acid | β-naphthol | Green-blue | Rubin. |
| 2.6-naphthylamincarboxylic acid | Dimethyl-m-toluidin | Red | Reddish-yellow. |
| " | Phenylmethylpyrazolon | Yellow | Yellow. |
| " | m-phenylene diamine | Brown | Reddish-yellow. |
| " | m-toluylene diamine | Yellow-red | Orange. |
| " | 1.5-naphthylene diamine | Dark brown | Reddish-rubin. |
| " | β-naphthol | Red | Rosa. |
| " | β-naphthylamine | Yellow-red | Yellow-orange. |
| " | Ethyl-β-naphthylamine | Red | Bluish-red. |
| " | α-naphthylamine | Black-brown | Orange. |
| " | Dimethylaniline | Black-brown | Yellow. |
| α-naphthylamine | 2.3-naphthylamincarboxylic acid | Black-brown | Yellow-red. |
| o-anisidin | " | Red | Orange. |
| p-aminoacetanilide | " | Red | Orange. |
| p-phenylene diamine | " | Brown | Brown. |
| p-nitraniline | " | Red-brown | Yellow-rubin. |
| p-nitro-o-anisidin | " | Dark red-brown | Red-violet. |
| p-cresidine | " | Red | Orange. |
| 2.4-dinitraniline | " | Blue-black | Bluish violet. |
| o-anisidin | 2.6-naphthylamin carboxylic acid | Reddish-yellow | Yellow. |
| aminohydroquinone-dimethylether | " | " | " |
| aniline | " | " | " |
| o-toluidin | " | " | " |
| o-chloraniline | " | " | " |
| α-naphthylamine | " | " | " |
| β-naphthylamine | " | " | " |
| 2.5-dichloraniline | " | " | " |
| m-chloraniline | " | " | " |
| para-nitraniline | " | Red-brown | Red. |
| p-nitro-o-anisidin | " | " | Bluish-red. |

We claim:

1. As new compounds, mono-azodyestuffs which are suitable for dyeing acetate silk, which dyestuffs contain a naphthylamin-carboxylic acid containing no free hydroxyl groups as one of the components, which are when dry yellow, red, blue to blackish powders, which on reduction with stannous chloride regenerate the original diazo- and coupling-components, the later containing an additional amino group, which dyestuffs dye acetate silk in strong yellow, red to blue-violet shades.

2. Acetate silk material dyed with the dyestuff as claimed in claim 1.

3. As new compounds, mono-azodyestuffs which are suitable for dyeing acetate silk, which dyestuffs contain 2.3-naphthylamin-carboxylic acid as one of the components, which are when dry yellow, red, blue to blackish powders, which on reduction with stannous chloride regenerate the original diazo- and coupling components, the latter containing an additional amino group, which dyestuffs dye acetate silk in strong yellow, red to blue-violet shades.

4. Acetate silk material dyed with the dyestuff as claimed in claim 3.

5. As new compounds, mono-azodyestuffs which are suitable for dyeing acetate silk, which dyestuffs contain as the coupling-component 2.3-naphthylamincarboxylic acid, which when dry are yellow, red, blue to blackish powders, which on reduction with stannous chloride regenerate the original diazo-compound and 1.2-diaminonaphthalene-3-carboxylic acid, which dyestuffs dye acetate silk in strong yellow, red to blue-violet shades.

6. Acetate silk material dyed with the dyestuff as claimed in claim 5.

7. As new compounds, the mono-azodyestuff: 4-nitro-6-methoxyphenyl-azo-2-naphthylamin-3-carboxylic acid, which is suitable for dyeing acetate silk, which when dry is a dark red-brown powder, which on reduction with stannous chloride yields 4-amino-2-anisidin and 1.2-diminonaphthalene-3-carboxylic acid and which dyes acetate silk in strong red-violet shades.

8. Acetate silk material dyed with the dyestuff as claimed in claim 7.

In testimony whereof, we affix our signatures.

LEOPOLD LASKA.
FRITZ WEBER.